May 15, 1951 — G. A. KUIPERS — 2,552,895

VACUUM GAUGE

Filed July 22, 1949 — 2 Sheets-Sheet 1

INVENTOR.
GEORGE A. KUIPERS
BY
ATTORNEYS

May 15, 1951 G. A. KUIPERS 2,552,895
VACUUM GAUGE

Filed July 22, 1949 2 Sheets-Sheet 2

INVENTOR.
GEORGE A. KUIPERS
BY
ATTORNEYS

Patented May 15, 1951

2,552,895

UNITED STATES PATENT OFFICE 2,552,895

VACUUM GAUGE

George A. Kuipers, Oak Ridge, Tenn., assignor, by mesne assignments, to Eastman Kodak Company, Rochester, N. Y., a corporation of New Jersey Application July 22, 1949, Serial No. 106,275

7 Claims. (Cl. 73—388)

This invention relates to vacuum measuring devices and is particularly concerned with mechanical means for measuring reduced pressures.

The widespread use of vacuum equipment has created a need for accurate measuring devices for determining the degree of vacuum. Gauges employed heretofore have been generally of two types. The first type provides an indirect method by measuring some physical property of the gases in the evacuated system as in the case of the ionization gauges and thermocouples. The second type of gauge is a manometric gauge wherein a volume of gas from the evacuated system is compressed and the original pressure of the gas is determined manometrically by means of the gas laws.

It is an object of this invention to provide mechanical means for measuring reduced pressure.

It is a further object of the invention to provide vacuum measuring apparatus free of sensitive elements subject to contamination.

It is another object of the invention to provide simple and compact vacuum measuring apparatus.

Another object of the invention is to provide vacuum measuring devices adaptable for use over a wide pressure range.

Another object of the invention is to provide means for accurately measuring vacuum in the range below 1 micron pressure.

Other objects will be apparent from the drawings, description and claims.

These and other objects are attained by means of this invention which is best illustrated with reference to the accompanying drawings.

Figure 1:
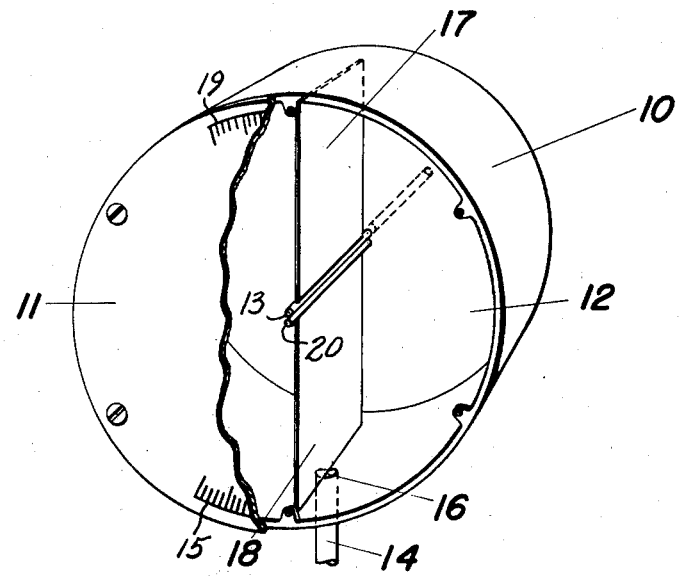
Fig. 1 is a perspective view partly broken away and in section illustrating the internal mechanism of a simple gauge embodying the invention.

An illustrative embodiment of the present gauge as shown in Fig. 1 comprises tubular side wall 10 and disc-like end walls 11 and 12 which together define a gas-tight vacuum chamber.

Figure 3:
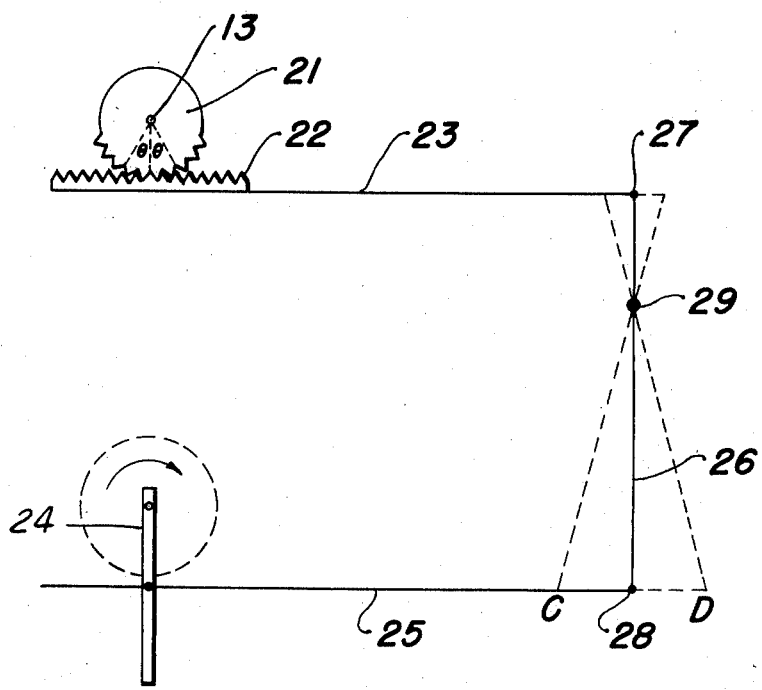
Fig. 3 is a schematic representation of preferred driving means for the gauges of Figs. 1 and 2.

Extending into the chamber in the region of the radial axis of the chamber is rotatable drive shaft 13 which enters the chamber through a packed gland opening (not shown) in end wall 12, the extension of shaft 13 outside the chamber being coupled to the driving mechanism shown in Fig. 3.

Conduit 14 communicates with the chamber through aperture 16 in side wall 10, the conduit being adapted to be connected to an evacuated system on which pressure measurements are to be taken.

Rectangular driving vane 17 is mounted on shaft 13 so as to oscillate when shaft 13 is actuated by the driving mechanism.

Vane 17, which is preferably constructed of a thin sheet of metal such as aluminum or the like extends outwardly from shaft 13 to a point contiguous to but out of frictional contact with side wall 10. The lateral edges of vane 17 in like manner are contiguous to but out of frictional contact with end walls 11 and 12. In gauges adapted primarily for measuring very low pressures, the spacing between the vane edges and the walls should be such as to minimize fluid flow between them in order to obtain sufficient pulsing pressure on the indicating vane to give a readily measurable oscillation with a relatively small amplitude oscillation of the driving vane.

Indicating vane 18 is pendulously mounted in the chamber by means of jewel supports (not shown) supporting upper edge 20 of vane 18. Vane 18 is free to swing in pendulum-like fashion about upper edge 20 as an axis of oscillation. Like driving vane 17, the edges of vane 18 are contiguous to but out of frictional contact with walls 10, 11 and 12.

Shaft 13 may be oscillated to oscillate vane 17 by any suitable driving mechanism as, for example, the mechanism schematically illustrated in Fig. 3 in which shaft 13 is coupled to pinion gear 21 which in turn engages rack 22 mounted on movable shaft 23. Movable shaft 23 is coupled to reciprocating member 25 by means of connector 26 and pivots 27 and 28. Connector 26 swivels on fulcrum pin 29 which is adjustable along connector 26 in order to permit controlled variation of the relative motion of shaft 23 and reciprocating member 25. Member 25 is pivotally secured to driving arm 24 which is mounted for rotation around one end of arm 24, arm 24 being rotated by suitable actuating means (not shown).

In operating the gauge of Fig. 1, conduit 14 is connected to the evacuated system on which pressure measurements are to be made. After lapse of time sufficient for the gauge chamber to be evacuated to a pressure corresponding to the system being measured, the driving mechanism of Fig. 3 is actuated and shaft 13 is thereby rotatably oscillated through angle $\theta$ in continuous fashion.

Vane 17 is thus caused to oscillate with a periodic motion from rest position through the angle $\theta$ on each side of rest position in a direction normal to the plane of the vanes. The alternate compression and expansion of gases in the confined zones between the vanes causes a pulsing pressure on vane 18 and it begins to swing in pendulum-like fashion in a direction normal to the plane of vane 18 until its frequency reaches the constant frequency of oscillation of driving vane 17.

At that point, the pulsing pressure on vane 18 serves merely to maintain the angle of oscillation of vane 18 at the maximum amplitude commensurate with the pulsing pressure being transmitted from vane 17 and so long as vane 18 maintains the maximum amplitude of oscillation, the compression of gases in the chamber is negligible and the pulsing force of driving vane 17 is directly transmitted to indicating vane 18. Thus by means of continued pulsing pressure, indicating vane 18 is caused to oscillate at an amplitude much greater than would result from a single oscillation of driving vane 17 whereby the gauge is operable at very low pressures.

The angular displacement of indicating vane at its maximum value is thereupon measured by any suitable means. For example, the end wall 11 can be constructed of transparent material with angular scales 15 and 19 superimposed on the face thereof to provide a direct reading of the amplitude of oscillation of each vane.

Alternatively, the gauge can be operated to cause indicating vane 18 to oscillate through a predetermined fixed angle as, for example, 4°, and the amplitude of oscillation of vane 17 necessary to oscillate vane 18 through 4° can be measured either directly on angular scale 19 or by calculation from the observed linear stroke of movable shaft 23 of the driving mechanism.

The gauge embodying this invention is adapted for use over a wide pressure range. It is of particular utility in measuring very low pressures where conventional gauges suffer greatest losses in sensitivity. At pressures below one micron as for example at pressures in the region of $10^{-8}$ mm., the driving vane is caused to oscillate at the natural frequency of the pendulum indicating vane whereby the pendulum indicating vane will oscillate at its natural period. At resonance frequency, the pulsing pressure necessary to oscillate the indicating vane is infinitesimal and leakage around the edges of the vane is not objectionable. The gauge is thus able to provide extremely sensitive measurement at pressures approaching zero. At higher pressures, it is not necessary to oscillate the driving vane at resonance frequency although such oscillating frequency is wholly satisfactory.

The period T of the indicating vane can be calculated from the equation for the pendulum at infinitesimal amplitude $$T = 2\pi\sqrt{\frac{I}{mgh}}$$

wherein

I = moment of inertia;
m = mass of vane;
g = acceleration of gravity; and
h = distance of center of gravity from the axis.

Since for the vane length $r$, $$I = \frac{mr^2}{3}$$

and $$h = \frac{r}{2}$$

the equation for period T becomes:

$$T = 2\pi\sqrt{\frac{2r}{3g}}$$

In constructing the gauge, therefore, a predetermined period may be chosen, as for example 0.40 second, in which case the length of the vane is chosen accordingly; or the vane may be constructed and its period calculated.

When the indicating vane is caused to oscillate through a predetermined angle, the amplitude of oscillation of the driving vane being increased until the indicating vane reaches the desired angular displacement, the angle of oscillation $\theta$ of the driving vane is readily calculated from the formula:

$$\theta = \pi \cdot \frac{n_1}{n_2} \cdot CD \cdot \frac{L}{M-L}$$

wherein $n_1$ = number of teeth per inch in rack 22
$n_2$ = number of teeth on pinion 21
CD = linear stroke of cam 25
L = distance from shaft 23 to pin 29; and
M = length of connector 26

Figure 2:
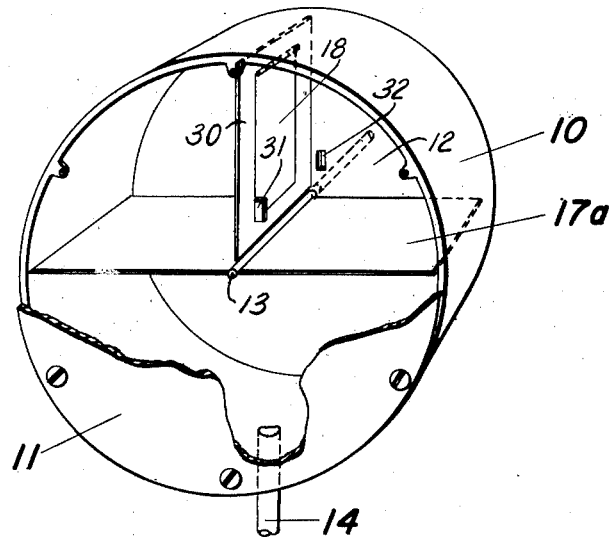
Fig. 2 is a perspective view partly broken away and in section of a preferred modification of the gauge shown in Fig. 1.

A preferred embodiment of the invention, as shown in Fig. 2, comprises, as in Fig. 1, a vacuum chamber defined by walls 10, 11 and 12, which chamber is provided with conduit 14. Drive shaft 13 supports and actuates the driving vane as set out hereinabove; but in this embodiment, driving vane 17a extends diametrically across the chamber substantially as shown. Door-like member 30 marginally encloses indicating vane 18 which is supported pendulously at its upper edge on knife edges or jewel supports (not shown). A small shield 31 is fastened to vane 18 in vertical alignment with windows 32 in end walls 11 and 12.

In the preferred method of operating the gauge shown in Fig. 2, indicating vane 18 is caused to oscillate through an angle of 4°. The amplitude of oscillation is determined by having shield 31 and windows 32 so spaced that when a beam of light is directed through windows 32, the beam is completely blocked momentarily by shield 31 at the furthest point of swing of vane 18 at the desired angle of oscillation.

Driving vane 17a is oscillated by shaft 13 so as to cause vane 18 to oscillate and the amplitude of oscillation of vane 17a necessary to drive vane 18 through the desired fixed angle is readily measured as described hereinabove.

The equation of motion of the indicating vane is as follows:

$$I\frac{d^2\phi}{dt^2} + mg\frac{r}{2}\sin\phi + \gamma\frac{d\phi}{dt} = A\frac{r}{2}(p_1 - p_2)$$

wherein $\phi$ = angular displacement of vane 18
$t$ = time of swing
$m$ = mass of vane 18
$g$ = acceleration of gravity
$r$ = length of vane 18
$A$ = area of vane 18
$I$ = moment of inertia of vane 18
$\gamma$ = damping constant
$(p_1 - p_2)$ = difference in pressures on opposite faces of vane 18

It has been found that the equation holds regardless of the leakage around the edges of the vanes, and at higher pressures it is often desirable to perforate the driving vane in order to reduce the amplitude of oscillation of the indicating vane. At low pressures, leakage should be minimized in order to facilitate reading of the gauge by maintaining oscillation at a readily measurable value.

Thus, by means of this invention, vacuum is measured by direct mechanical means of simple construction. By the use of a pulsing driving force, compression effects are minimized. The gauge is useful over a wide range of pressures, and extremely low pressures are readily measured by pulsing the driving vane at the natural frequency of the indicating vane.

While the invention has been described in considerable detail with reference to certain preferred embodiments thereof, it will be understood that variations and modifications can be effected within the spirit and scope of the invention as shown in the drawings, described herein and as defined in the appended claims.

What I claim is:

1. A vacuum gauge comprising in combination wall means defining a gas-tight vacuum chamber, conduit means communicating with said chamber and adapted to be connected to an evacuated system, a plate-like driving vane, means for pivotally mounting said driving vane in said chamber, driving means for imparting periodic oscillatory motion to said driving vane in a direction normal to the plane of said vane, a plate-like indicating vane, means for pendulously mounting said indicating vane in free swinging movement about its upper edge in a direction normal to the plane of said indicating vane, and means for measuring the amplitude of oscillation of said driving vane and said indicating vane, said vanes together with said wall means being arranged to partition said chamber into a confined zone between said vanes whereby oscillatory motion of said driving vane periodically compresses gaseous fluid in said zone.

2. A vacuum gauge comprising in combination wall means defining a generally cylindrical vacuum chamber, conduit means communicating with said chamber and adapted to be connected to an evacuated system, a plate-like driving vane, means for pivotally mounting said driving vane in said chamber for oscillatory motion about the radial axis of said chamber in a direction normal to the plane of said vane, rotatable driving means associated with said driving vane and arranged to positively actuate said driving vane in periodic oscillatory manner, a plate-like indicating vane, means for pendulously mounting said indicating vane in said chamber for free swinging motion about the upper edge of said indicating vane in a direction normal to said upper edge, said indicating vane being mounted with the upper edge of said indicating vane parallel to said radial axis of said chamber, said vanes and said wall means being arranged to partition said chamber into at least two confined zones whereby oscillatory motion of said driving vane is transmitted to said indicating vane by pressure on gaseous fluid in said zones, and means for measuring the amplitude of oscillation of said driving vane and said indicating vane.

3. A vacuum gauge comprising in combination cylindrical side wall means and disc-like end wall means defining a cylindrical vacuum chamber, a rotatable driving shaft extending into said chamber along the radial axis of said chamber, a rectangular driving vane mounted on said shaft with the plane of said vane parallel to said shaft, said driving vane extending outwardly from said shaft and having the edges of said vane contiguous to said cylindrical wall means and end wall means, an indicating vane, means for pendulously mounting said indicating vane in said chamber in a plane parallel to said radial axis, said indicating vane being free to swing in pendulum-like fashion in a direction normal to the plane of said indicating vane, said indicating vane having the edges thereof contiguous to said end wall means, said indicating vane extending substantially the extent of the radius of said chamber from said radial axis to said cylindrical wall means, whereby said chamber is partitioned into confined zones by said vanes, reciprocating driving means for actuating said driving shaft and imparting periodic oscillating motion to said driving vane, and means for measuring the amplitude of oscillation of said vanes.

4. A vacuum gauge comprising in combination a tubular side wall and disc-like end walls defining a cylindrical vacuum chamber, conduit means communicating with said chamber and adapted to be connected with an evacuated system, a rotatable drive shaft extending into said chamber and lying along the radial axis of said chamber, a flattened rectangular driving vane having one end mounted along said drive shaft and extending outwardly from said shaft toward said tubular side wall, the lateral edges of said vane being contiguous to the end walls of said chamber and the free end of said vane being contiguous to said tubular side wall, driving means including rack and pinion means coupled with said shaft and arranged to oscillate said shaft and thereby oscillate said driving vane, a flattened rectangular indicating vane, means for pendulously mounting said indicating vane from its upper edge in said chamber for free swinging motion about said upper edge of said indicating vane, the upper edge of said indicating vane being parallel to said drive shaft, said indicating vane being spaced around the chamber from said driving vane, the lateral edges of said indicating vane being contiguous to said end walls of said chamber, said indicating vane extending from the region of the radial axis of said chamber substantially to said tubular side wall, and means for measuring the amplitude of oscillation of said indicating vane and said driving vane.

5. A vacuum gauge comprising in combination wall means defining a vacuum chamber, said wall means comprising tubular side wall means and disc-like end wall means closing the ends of said side wall means, a rotatable drive shaft extending into said chamber along the radial axis of said chamber, a flattened rectangular driving vane mounted on said shaft in said chamber and extending diametrically across substantially the extent of said chamber, the edges of said driving vane being contiguous to said wall means around the marginal extent of said driving-vane, driving means coupled with said shaft and arranged to oscillate said shaft, a flattened rectangular indicating vane, means for pendulously mounting said indicating vane in said chamber along one edge of said indicating vane, said indicating vane being free to swing in pendulum-like manner with said edge being the axis of rotation, said indicating vane extending substantially across said chamber between said end wall means and extending from the region of said radial axis of said chamber outwardly substantially to said side wall means, said indicating vane normally being in a plane parallel to said radial axis of said chamber, and means for indicating the amplitude of oscillation of said driving vane and said indicating vane.

6. A vacuum gauge comprising in combination wall means defining a vacuum chamber and paired vane means partitioning said chamber, said wall means and said vane means combining to define a generally confined zone between said paired vane means, said vane means having margins contiguous to said wall means but out of frictional contact with said wall means, said paired vane means comprising a flattened driving vane rigidly mounted on a rotatable shaft extending into said chamber and a flattened indicating vane pendulously mounted in said chamber along one edge of said indicating vane and free to swing in pendulum-like manner with said edge being the axis of rotation, oscillatory driving means coupled to said rotatable shaft and arranged to rotate said shaft in reciprocal fashion and thereby oscillate said driving vane, and means indicating the amplitude of oscillation of said driving vane and said indicating vane.

7. A vacuum measuring device comprising in combination, within a closed chamber having communication with an evacuated zone, of an oscillatable driving vane adapted to create periodic pulsations in the gas in said chamber and a swingable indicating vane movable in pendulum fashion in response to said pulsations.

GEORGE A. KUIPERS.

REFERENCES CITED

The following references are of record in the file of this patent:

UNITED STATES PATENTS

| Number | Name | Date |
|---|---|---|
| 1,126,233 | Langmuir | Jan. 26, 1915 |